United States Patent Office 2,871,804
Patented Feb. 3, 1959

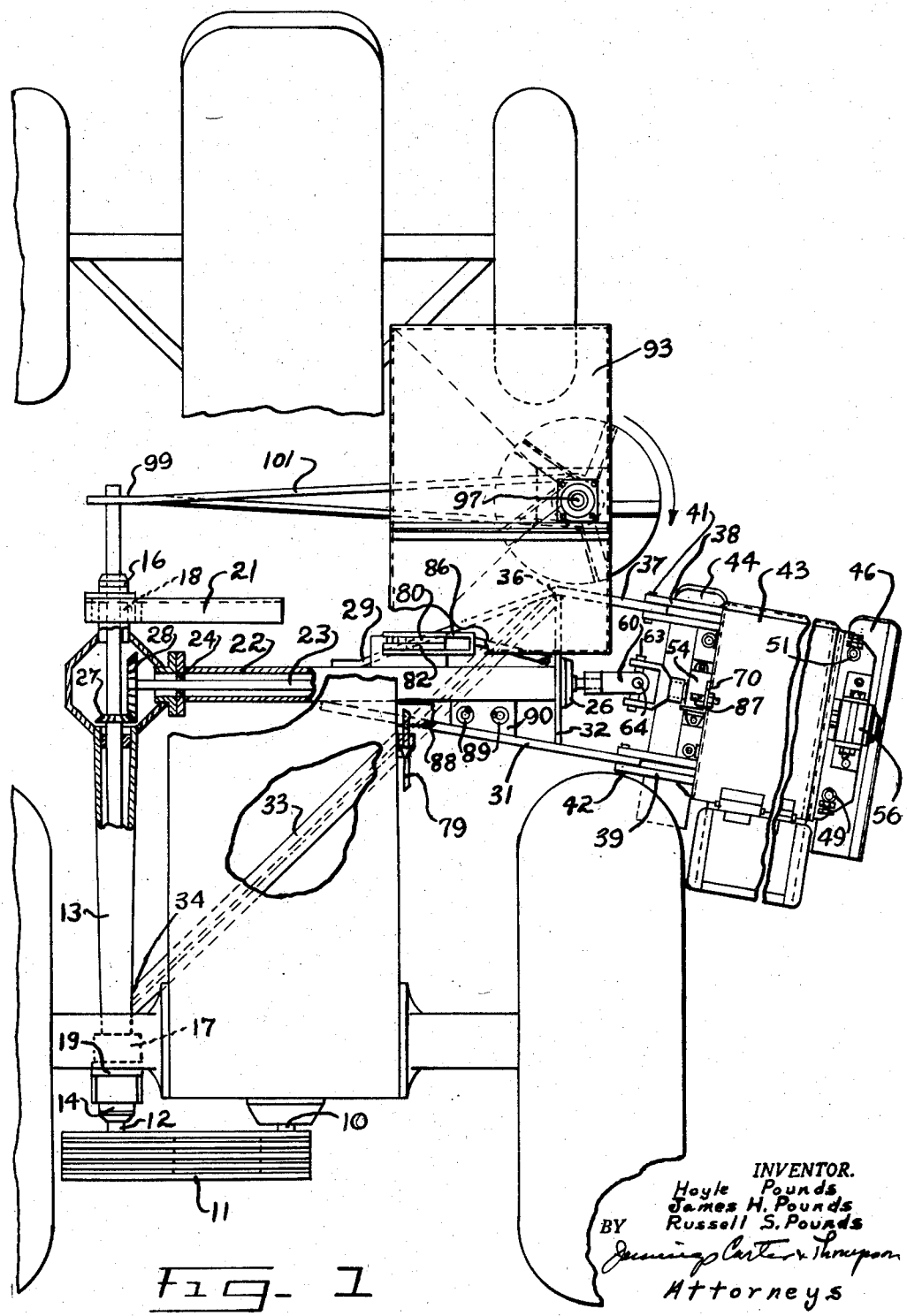

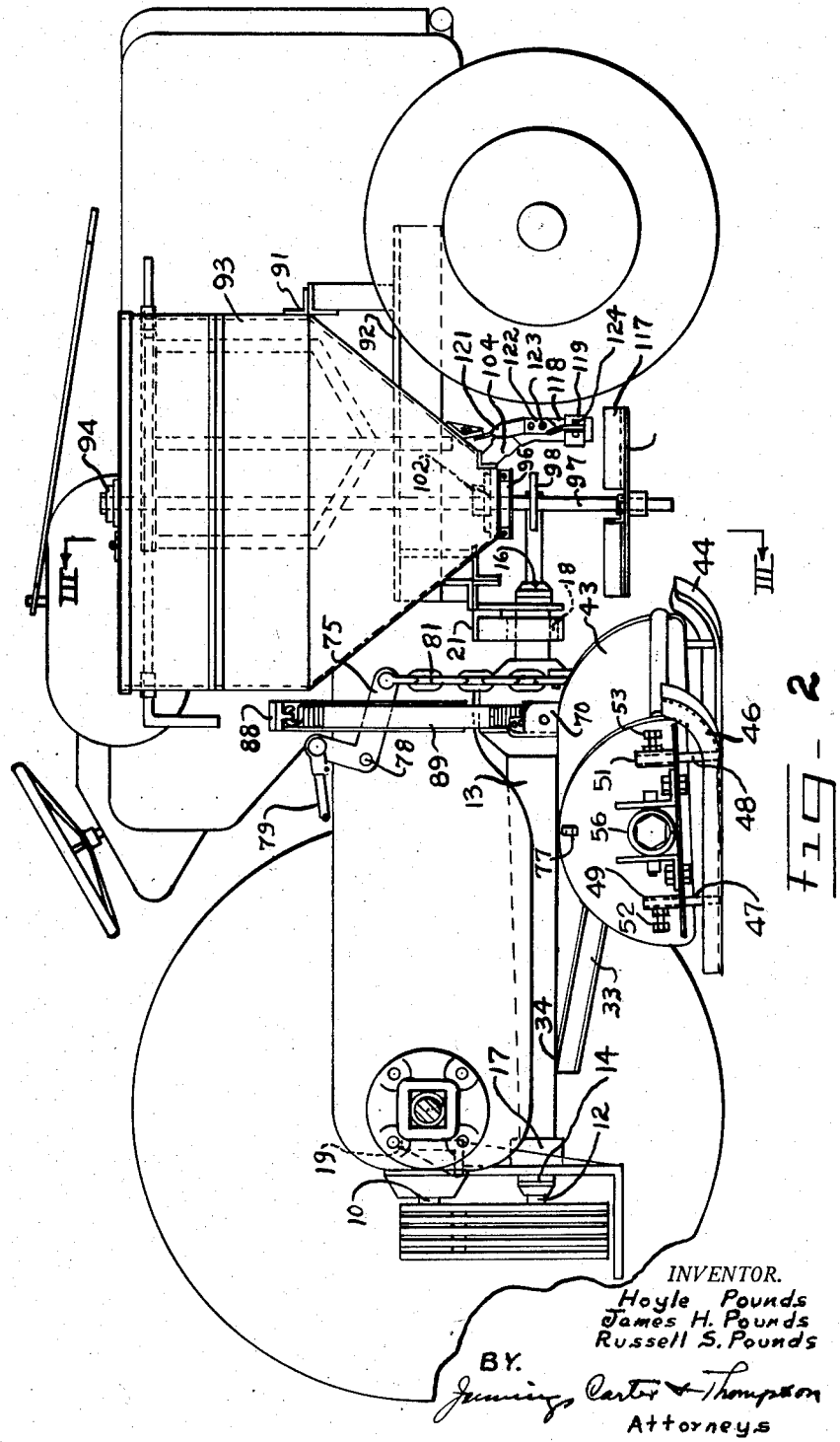

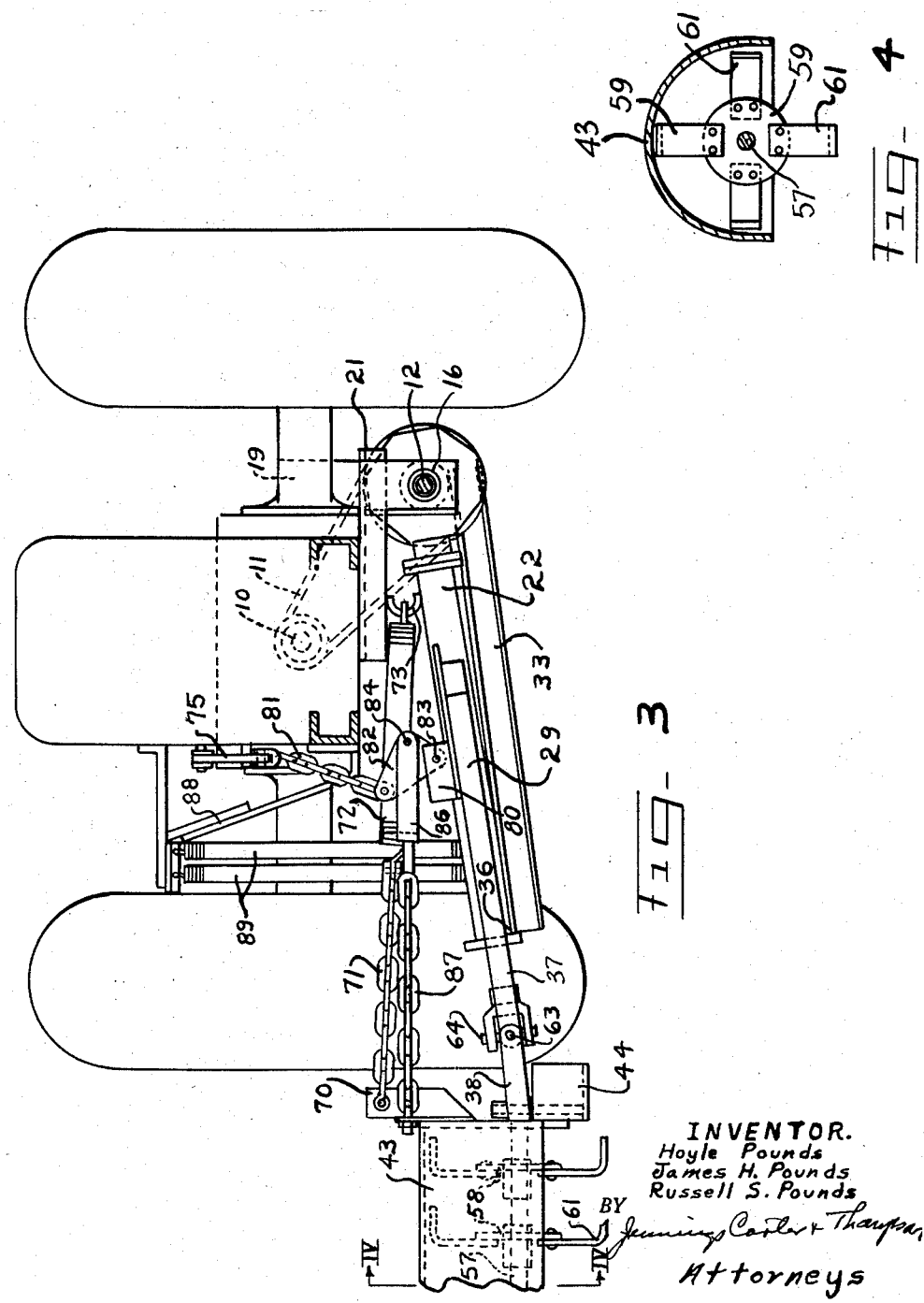

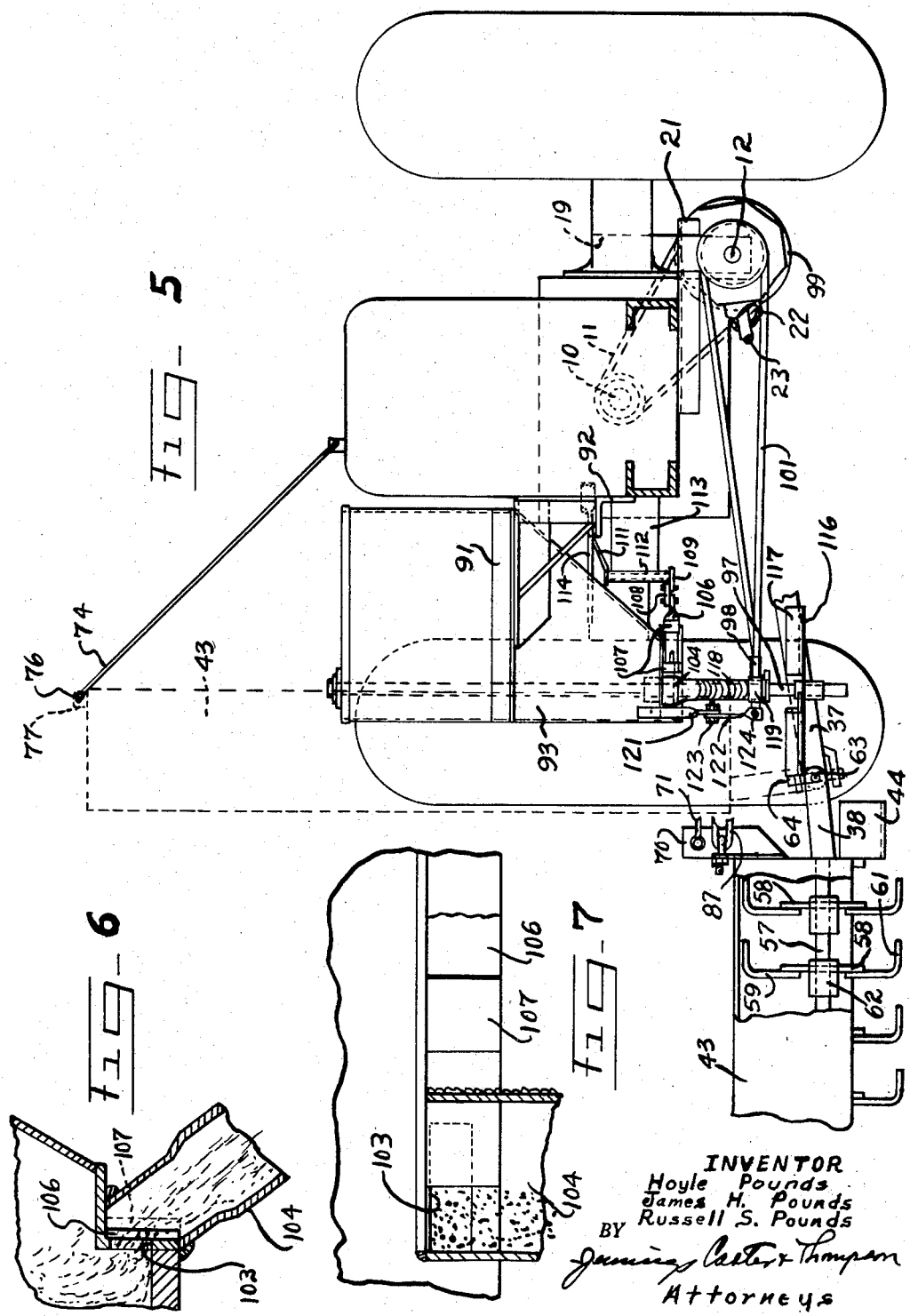

2,871,804

COMBINED TREE CULTIVATOR AND FERTILIZER DISTRIBUTOR

Hoyle Pounds, James H. Pounds, and Russell S. Pounds, Winter Garden, Fla., assignors to Pounds Motor Co., Inc., a corporation of Florida Application April 15, 1957, Serial No. 652,798

8 Claims. (Cl. 111—11)

This invention relates to a combined tree cultivator and fertilizer distributor and has for an object the provision of apparatus of the character designated which shall include improved cultivating means adapted to cultivate the soil around trees and beneath the low hanging branches of trees and which shall also include means for distributing fertilizer ahead of the cultivating means under the tree branches.

A further object of our invention is to provide an improved combined tree cultivator and fertilizer distributor together with improved means to mount the same for operation on a tractor vehicle.

Briefly our invention includes improved means for mounting a tree cultivator on a tractor vehicle including a main drive shaft driven from the power take off of the tractor, a housing pivotally mounted on the tractor frame in which the drive shaft is mounted, a second shaft housing rigidly connected to and extending at right angles to the main drive shaft housing, a countershaft in the second housing driven from the main shaft, a cultivating tool frame pivotally connected to the second housing and extending outwardly from the tractor and a cultivating tool mounted in the housing and pivotally connected to and driven by the countershaft, together with a fertilizer distributor mounted in front of, and constructed and arranged to spread fertilizer outwardly from the tractor in front of the cultivating tool.

Apparatus embodying features of our invention is illustrated in the accompanying drawings in which:

Fig. 1 is a plan view;

Fig. 2 is a side elevation with parts broken away and in section;

Fig. 3 is a sectional view taken generally along the line III—III of Fig. 2 with the fertilizer distributor removed and with the motor indicated diagrammatically;

Fig. 4 is a detail sectional view taken along the line IV—IV of Fig. 3;

Fig. 5 is a sectional view similar to Fig. 3 with the fertilizer distributor in place and with the motor shown diagrammatically;

Fig. 6 is a detail sectional view of the fertilizer feed regulator; and,

Fig. 7 is a detail sectional view taken at right angles to Fig. 6.

Referring now to the drawings for a better understanding of our invention we show in Fig. 1 a well-known form of tractor vehicle having the usual power-take off shaft 10 at the rear which, through V-belts 11 drives a drive shaft 12 which extends forwardly beneath the tractor. In accordance with our invention, we mount the drive shaft 12 in a drive shaft housing 13 with bearings 14 and 16 carried by the drive shaft housing for the drive shaft 12. The drive shaft housing 13 is in turn mounted in bearings 17 and 18 which are supported from the frame of the tractor by structural members 19 and 21 secured to the frame of the vehicle in any suitable manner, as by welding. By reason of this mounting of the drive shaft housing 13, it is free to oscillate in its bearings.

Rigidly connected to the drive shaft housing 13 and extending laterally outwardly therefrom is a countershaft housing 22 in which a countershaft 23 is mounted, the bearings therefor being shown at 24 and 26. The countershaft 23 is driven from the drive shaft 12 by means of a bevel gear 27 mounted on the drive shaft and a meshing bevel gear 28 mounted on the countershaft 23.

Rigidly connected to the counter shaft housing 22 and extending outwardly therefrom at an acute angle are frame members 29 and 31. A cross brace 32 connects the members 29 and 31 and is joined to the outer end of the drive shaft housing 22 adjacent the bearing 26. A frame member 33 is rigidly joined to the drive shaft housing 13 at 34 and extends diagonally forward to be joined to the forwardmost frame member 29 at 36 where it also connects to the cross member 32. The outer end of the frame member 29 is turned to provide a portion 37 which is parallel to the outer end of the frame member 31.

Pivotally connected to the outer ends of the frame members 37 and 31 is a cultivator, or hoe frame having side members 38 and 39 which are pivotally connected to the frame members 37 and 31 by means of bolts 41 and 42. A housing or cover 43 is rigidly joined to the frame members 38 and 39. Sliding supports 44 and 46 are mounted on the ends of the housing 43. As best shown in Fig. 2, each of the sliding supports 44 and 46 is secured by upstanding bolts 47 and 48 which extend up into sleeves 49 and 51 mounted on the ends of the housing 43. The position of the bolts 47 and 48 in the sleeves 49 and 51 is adjusted by means of set screws 52 and 53 whereby the height of the housing and the depth of the cut of the cultivator elements, later to be described, may be adjusted.

Mounted in bearings 54 and 56 on the ends of the housing 43 is a cultivator shaft 57. Mounted on the shaft 57 at regular intervals are discs 58 each having a plurality of radial arms 59 thereon with their outer ends 61 and 62 turned at right angles to extend parallel to the axis of the shaft 57. The cultivator shaft 57 is driven from the counter-shaft 23 being connected thereto by means of a Hooke's universal joint 60 having intersecting pintles 63 and 64 at right angles to each other. By reference to Fig. 1 of the drawing it will be seen that the centers of the pivots 41 and 42 and the central point of intersection of the pintles 63 and 64 lie in a straight line. This is a very important feature of our invention in that it permits the sliding supports 44 and 46 to move over uneven ground, following the contour thereof, with the cultivator frame pivoting about the pivots 41 and 42 and the cultivator shaft about the point of intersection of the pintles 63 and 64. This, coupled with the fact that the drive shaft housing 13 is free to oscillate and the countershaft housing 22 being rigidly connected thereto, insures freedom of the cultivator frame to follow the uneven contour of the ground and also permits the cultivator to be raised when required.

Mounted on the end of the housing or cover 43 adjacent the tractor vehicle, is an upwardly extending bracket 70 having a chain 71 connected thereto, the other end of which is connected to a counterbalancing spring 72 having its opposite end connected by an anchoring hook 73 on the inner end portion of the counter shaft housing 22. This spring counterbalances, in part, the weight of the cultivator and its housing and makes it possible to regulate the amount of weight of the outer end of the cultivator housing bearing on the ground and whenever it becomes necessary to raise the cultivator housing and move the apparatus for a considerable distance. When the housing is thus raised, it may be secured in place by means of a rod 74 having a hook 76 on its outer end which engages a lug 77 (see Fig. 2) on the outer end of the cover 43. In moving short distances, as from one tree which is being cultivated to another, the cultivator frame may be raised a short distance above the ground by means of a bell crank lever 75 mounted at 78 on the frame of the vehicle. One arm of the bell crank lever may be actuated by a rod 79 by any suitable means, such as a hydraulic cylinder (not shown). The other arm of the bell crank lever 75 is connected by means of a chain 81 to a lever like bracket 82 which is pivotally connected at 83 to a bracket 80 mounted on the countershaft housing 22. At an intermediate point, the bracket 82 is connected by means of a pivot pin 84 to a yoke 86 which is connected by means of a chain 87 to the bracket 70 on the end of the cultivator housing 43.

Mounted on the side of the vehicle frame is a bracket 88 which extends outwardly over the outer end of the countershaft housing 22. A pair of springs 89 are connected at their upper ends to the bracket 88 and at their lower ends to a bracket 90 mounted on the side of the countershaft housing 22. The springs 89 act to counterbalance the weight of the outer end of the counter shaft housing 22 and the downward pull exerted by the counterbalance spring 72.

Mounted on the side of the vehicle frame and supported by suitable structural members such as 91 and 92 is a fertilizer hopper 93. Extending downwardly through the hopper 93 and supported in bearings 94 at the top and 96 at the bottom is a vertical shaft 97. Mounted on the shaft 97 is a pulley 98 and mounted on the forward end of the drive shaft 12 is a pulley 99. A belt 101 transmits power from the pulley 99 to the pulley 98 and shaft 97. Mounted within the hopper 93 on the shaft 97 are agitating members 102 which rotate with the shaft and serve to loosen the fertilizer in the hopper. In the forward side of the bottom of the hopper directly in front of the agitating members is a feed opening 103 through which fertilizer is discharged into a downwardly extending pipe connection 104. Mounted in front of the feed opening 103 is a sliding door 106 which may be moved laterally to control the amount of opening of the feed opening 103. The sliding door 106 is guided in its movements by means of guide plates 107 mounted in front of the sliding door. The door 106 is connected by means of a link 108 to a crank 109 which is actuated by a crank arm 111 and crank shaft 112 mounted on a bracket 113 secured to the frame of the vehicle. The crank arm 111 may be actuated by the operator through a pull rod 114 extending rearwardly to any suitable location.

Mounted on the lower end of the shaft 97 is a disc 116 having a plurality of radial vanes 117 mounted on its upper side and which, when the apparatus is in operation, rotates in a clockwise direction when viewed from above. Mounted on the lower end of the pipe connection 104 is a flexible section 118 which serves to deliver the fertilizer directly onto the disc 116. The lower end of the flexible section 118 is mounted in a sleeve 119. Depending from the hopper 93 is a bracket 121 to which a link 122 is connected by means of a nut and bolt connection 123. The lower end of the link 122 is connected at 124 to the sleeve 119. By this means, the position of the lower end of the section 118 with respect to the disc 116 can be adjusted. As shown in Figs. 2 and 5, the fertilizer is delivered through the flexible pipe 118 directly in front of the shaft 97 whereby, with the disc 116 rotating in a clockwise direction, as viewed from above, fertilizer is thrown tangentially outwardly laterally of the vehicle frame and directly in front of the cultivator frame and is worked into the soil by action of the ground working elements 59, 61, and 62. It will be understood that the tractor vehicle will be equipped with the usual means to control the operation of the power take-off and drive shaft 12 and accordingly no description of such means is here described.

From the foregoing description, the operation of our improved apparatus will be readily understood. With the cultivator frame lowered to the position shown in Figs. 1, 2, 3 and 5, it will be seen that the cultivator frame will slide over the ground on the sliding supports 44 and 46 and will follow the contour of the ground. The friction, or drag, of the frame is greatly reduced by reason of the counterbalancing of the weight of the frame by means of the springs 72 and 89. In its travel over the ground the up and down movement of the cultivator frame, due to the unevenness of the ground is made possible by reason of the fact that the drive shaft housing 13 is pivotally mounted in the bearings 18 and 19 and the countershaft housing 22 is rigidly connected to the drive shaft housing 13. Inasmuch as the cultivator frame extends laterally outwardly from the tractor vehicle, it is possible to cultivate under the low hanging branches of trees wtihout damage to the trees. At the same time, the needed fertilizer is spread in front of the soil working tools and is worked into the soil. In moving from tree to tree, the cultivator frame may be raised by means of the bell crank lever 75 and chain 81. When necessary to move for a considerable distance, the frame is raised manually to the dotted line vertical position shown in Fig. 5 of the drawing and is secured in place by the rod 74.

From the foregoing, it will be apparent that we have devised an improved combined cultivator or tree hoe, and fertilizer distributor, which is simple and sturdy of design and operation and economical of manufacture.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In combination with a tractor vehicle having a power takeoff, a drive shaft housing extending forwardly under the vehicle and pivotally secured in end bearings mounted thereon, a drive shaft in the housing driven from the power takeoff, a countershaft housing rigidly connected to and extending outwardly from the drive shaft housing, a countershaft mounted in the countershaft housing, and driven directly from the drive shaft, a cultivator frame pivotally mounted on the outer end of the counter shaft housing, a cultivator tool assembly mounted in the cultivator frame including a horizontal shaft driven directly from the countershaft and connected thereto by a universal joint, and sliding supports mounted on the ends of the cultivator frame to engage the ground when the cultivator is in use.

2. Apparatus as defined in claim 1 in which a diagonal brace is connected to and extends from the rear of the drive shaft housing to the outer end portion of the counter shaft housing to which it is operatively connected.

3. Apparatus as defined in claim 1 in which vertically disposed spring means are operatively connected between the vehicle frame and the outer end of the countershaft housing to counterbalance the downward pull of the outer end of the countershaft and its connections, in which other horizontally disposed spring means are operatively connected between the cultivator frame and the countershaft housing to counterbalance the weight of the outer end portion of the cultivator frame and cultivator tool, and in which a diagonally extending brace connects the rear end portion of the drive shaft housing with the outer end portion of the countershaft housing.

4. In combination with a tractor vehicle having a power takeoff, a drive shaft housing extending forwardly under the vehicle and pivotally secured in end bearings mounted thereon, a drive shaft in the housing driven from the power takeoff, a countershaft housing rigidly connected to and extending outwardly from the drive shaft housing intermediate the ends thereof, a countershaft mounted in the countershaft housing and driven directly from the drive shaft, a cultivator frame pivotally mounted on the outer end of the countershaft housing, a cultivator tool assembly mounted in the cultivator frame including a horizontal shaft driven directly from the countershaft and connected thereto by a universal joint, said cultivator frame extending laterally outward from the vehicle frame, sliding supports mounted on the ends of the cultivator frame to engage the ground when the cultivator is in use, a fertilizer distributor mounted on the vehicle in front of the countershaft housing laterally of the cultivator tool, means to drive the fertilizer distributor from the drive shaft, and means included in the fertilizer distributor to effect broadcasting fertilizer laterally only in front of the cultivator tool.

5. In combination with a tractor vehicle having a power takeoff, a drive shaft housing extending forwardly under the vehicle and pivotally secured in end hearings mounted thereon, a drive shaft in the housing driven from the power takeoff, a countershaft housing rigidly connected to and extending outwardly from the drive shaft housing intermediate the ends thereof, a countershaft mounted in the countershaft housing and driven directly from the drive shaft, a cultivator frame pivotally mounted on the outer end of the countershaft housing, a cultivator tool mounted in the cultivator frame including a horizontal shaft driven directly from the countershaft and connected thereto by a universal joint, sliding supports mounted on the ends of the cultivator frame to engage the ground when the cultivator is in use, a fertilizer distributor hopper mounted on the vehicle in front of the countershaft housing, a disk mounted below the hopper and disposed to rotate in a horizontal plane, radial vanes on the upper side of the disk, means to feed fertilizer from the hopper onto the upper side of the disk, and means to rotate the disk in a direction to cause it to limit the throw of the fertilizer to an area laterally of the tractor vehicle in front of the cultivator tool.

6. In a combined cultivator and fertilizer distributor propelled over the ground and driven by a tractor vehricle having a power takeoff, a drive shaft housing extending forwardly under the tractor vehicle and pivotally secured in end bearings mounted thereon, a drive shaft mounted in the housing driven from the power takeoff, a countershaft housing rigidly connected to the drive shaft housing and extending laterally therefrom at approximately a right angle to the drive shaft housing, a countershaft mounted in the countershaft housing and driven from the drive shaft, a cultivator frame pivotally connected to the countershaft housing and extending laterally outward from the tractor vehicle, sliding supports mounted on the ends of the cultivator frame to engage the ground when the cultivator is in use, a cultivator assembly mounted in the cultivator housing and driven from the countershaft, fertilizer distributing means mounted on the tractor forwardly of the countershaft, means to drive the fertilizer distributing means from the drive shaft, and means included in the fertilizer distributing means to broadcast fertilizer laterally only in front of the cultivator assembly.

7. In combination with a tractor vehicle having a power takeoff, a drive shaft housing extending forwardly under the vehicle and pivotally secured in end hearings mounted thereon, a drive shaft in the housing driven from the power takeoff, a countershaft housing rigidly connected to and extending outwardly from the drive shaft housing, a countershaft mounted in the countershaft housing, and driven directly from the drive shaft, a cultivator frame pivotally mounted on the outer end of the countershaft housing, a cultivator tool assembly mounted in said frame and driven directly from the countershaft, a vertically disposed spring connected at one end to the vehicle frame and at the other end to the countershaft housing and effective to counterbalance the weight and downward pull of the countershaft housing, an upwardly extending bracket mounted on the end of the cultivator frame adjacent the vehicle, a horizontally disposed spring operatively connected at one end to said bracket and at the other end to the inner end of the countershaft housing and effective to counterbalance the weight on the outer end portion of the cultivator frame, and sliding supports mounted on the ends of the cultivator frame to engage the ground when the cultivator is in use.

8. In combination with a tractor vehicle having a power takeoff, a drive shaft housing extending forwardly under the vehicle and pivotally secured in end hearings mounted thereon, a drive shaft in the housing driven from the power takeoff, a countershaft housing rigidly connected to and extending outwardly from the drive shaft housing, a countershaft mounted in the countershaft housing, and driven directly from the drive shaft, a cultivator frame pivotally mounted on the outer end of the countershaft housing, a cultivator tool assembly mounted in said frame and driven directly from the countershaft, vertically disposed spring means operatively connected between the vehicle frame and the countershaft housing counterbalancing the weight and downward pull on the outer end of the countershaft housing, other horizontally disposed spring means operatively connected between the cultivator frame and the countershaft housing to counterbalance the weight on the outer end portion of the cultivator frame, and sliding supports mounted on the ends of the cultivator frame to engage the ground when the cultivator is in use.

References Cited in the file of this patent

UNITED STATES PATENTS

| | | |
|---|---|---|
| 925,565 | Curtis | June 22, 1909 |
| 2,162,689 | Mayfield | June 20, 1939 |
| 2,519,243 | Gjertson | Aug. 15, 1950 |
| 2,526,396 | Nowlin | Oct. 17, 1950 |
| 2,594,084 | Skibbe et al. | Apr. 22, 1952 |
| 2,757,504 | Elfes et al. | Aug. 7, 1956 |
| 2,771,829 | Sahlbom | Nov. 27, 1956 |
| 2,774,318 | Johnson | Dec. 18, 1956 |
| 2,801,509 | Salzmann | Aug. 6, 1957 |